Nov. 5, 1957 A. H. TIRRILL ET AL 2,811,944
AUTOMATIC TRAP NEST
Filed Sept. 7, 1956 3 Sheets-Sheet 3
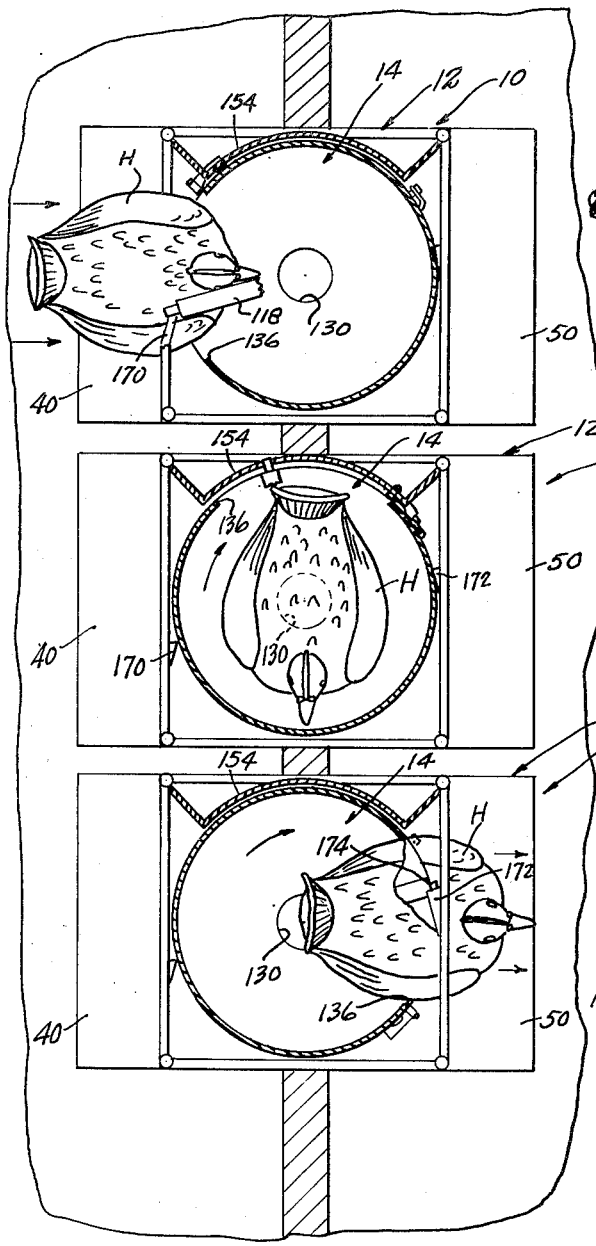
FIG. 7.
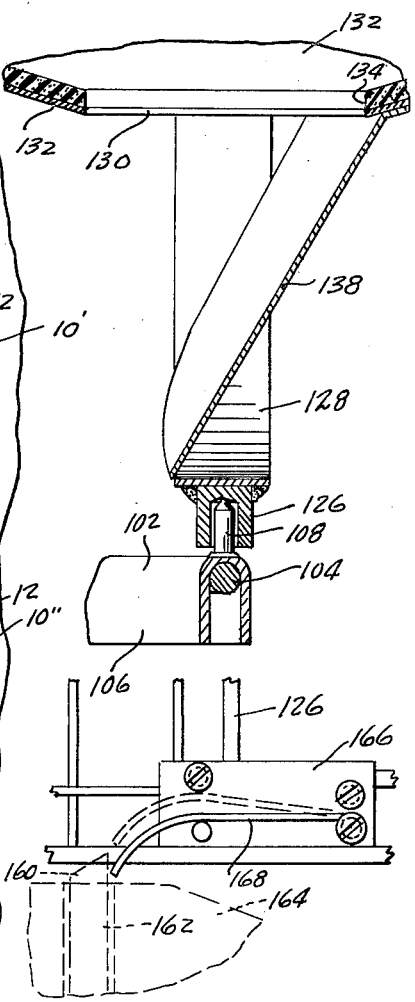
FIG. 5.
FIG. 6.
INVENTORS
ALLEN H. TIRRILL,
ESTHER M. TIRRILL,
BY
McMorrow, Berman + Davidson
ATTORNEYS

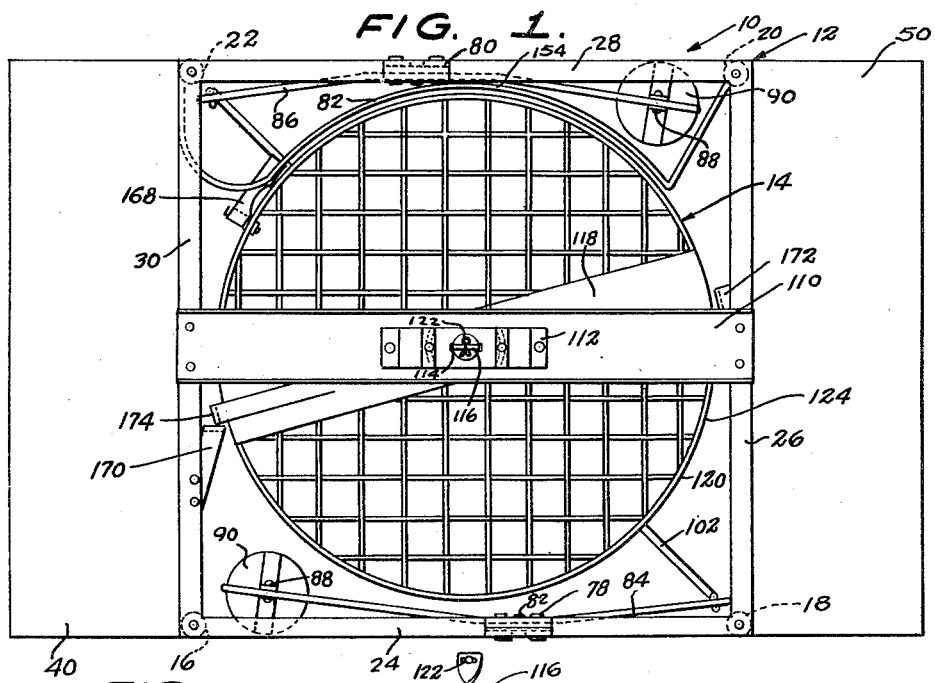
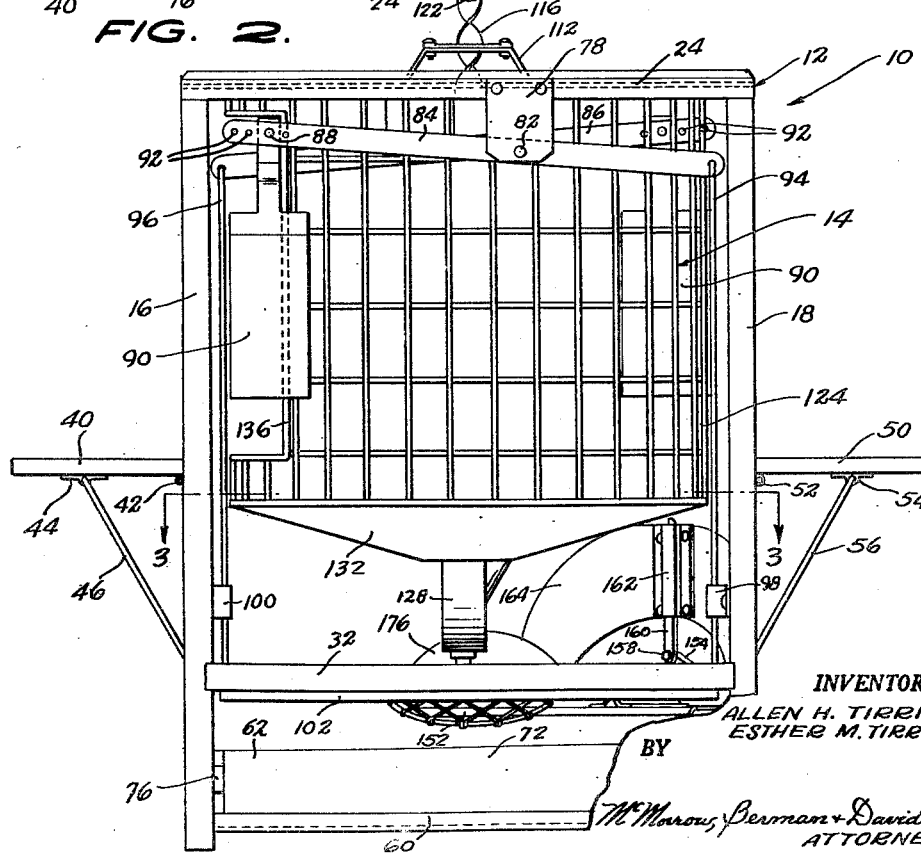

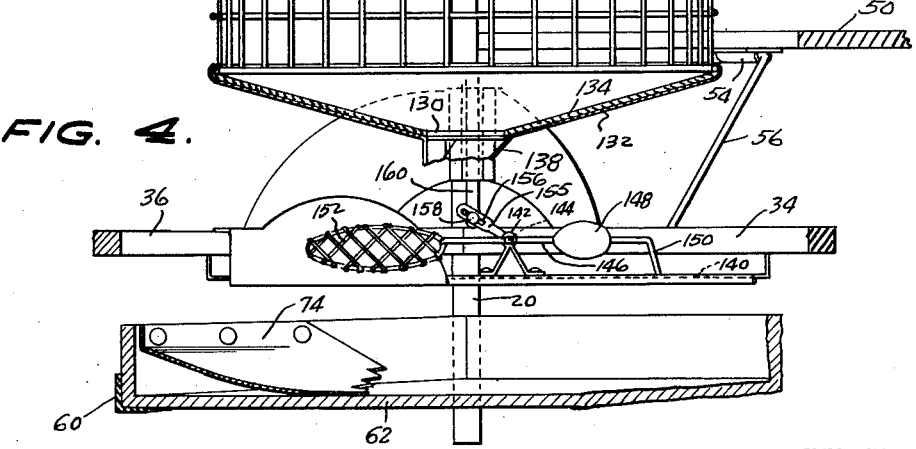

United States Patent Office 2,811,944
Patented Nov. 5, 1957

2,811,944

AUTOMATIC TRAP NEST

Allen H. Tirrill and Esther M. Tirrill, Gothenburg, Nebr.

Application September 7, 1956, Serial No. 608,521

4 Claims. (Cl. 119—47)

This invention relates generally to animal husbandry and is more particularly concerned with a novel automatic trap nest for a poultry farm or the like.

When maintaining a flock of chickens for egg laying purposes, it is highly desirable to have means whereby the "layers" are separated from the "non-layers," means whereby eggs once having been laid are immediately disposed away from a chicken having laid the same in order that the egg will be maintained clean and for purpose of preventing the chicken from eating the egg, and means for retaining a chicken on a nest once it has entered the same until an egg has been laid.

A primary object of invention is to provide an automatic trap nest which includes means for accomplishing the desired functions heretofore set forth, with a minimum amount of maintenance and care and a maximum amount of efficiency.

A further object of invention in conformance with that set forth is to provide a novel automatic trap nest which incorporates a support frame including on opposite sides thereof entrance and exit portions, said support frame rotatably supporting an enclosure including an access aperture in one side thereof, said enclosure being rotatable and vertically displaceable in response to the entry of a chicken therein for the purpose of overcoming counter balance means wherein the entry of a chicken in the enclosure will rotate the same to a position wherein the chicken will be retained in the enclosure until an egg is laid, and upon the laying of an egg the enclosure will rotate to a position to permit the exit of the chicken from the enclosure, the weight of chicken in the enclosure actuating means whereby the enclosure is returned to a position permitting the subsequent entrance of another chicken into the enclosure.

And yet another object of invention in conformance with that set forth resides in the specific details of the novel functioning structure of the automatic trap nest of the invention which cooperates to give rise to the desirable results heretofore set forth.

And yet a still further object of invention in conformance with that set forth is to provide a novel automatic trap nest of the character involved which is readily and economically manufactured, easily installed and maintained, and highly satisfactory, practical and acceptable for the purpose intended.

These together with other objects and advantages which will subsequently become apparent reside in the details of construction and operation as more fully hereinafter described and claimed, reference being had to the accompanying drawing forming a part hereof wherein like numerals refer to like parts throughout, and in which:

Figure 1 is a top plan view of the novel automatic trap nest;

Figure 2 is a side elevational view of the novel trap nest looking from the lower side of Figure 1, a portion thereof being broken away;

Figure 3 is a sectional view taken substantially on line 3—3 of Figure 2, a portion being broken away for the purpose of clarity;

Figure 4 is a fragmentary sectional view taken substantially on line 4—4 of Figure 3;

Figure 5 is an enlarged fragmentary sectional view taken substantially on line 5—5 of Figure 3;

Figure 6 is an enlarged fragmentary sectional view taken substantially on line 6—6 of Figure 3, showing in phantom lines the vertically displaceable stop element disposable in the path of rotation of the radially extending abutment on the nest enclosure of the invention; and Figure 7 is a diagrammatic plan view of the automatic trap nest, showing the steps or movement thereof when utilized by a chicken entering the same, laying an egg and subsequently leaving the nest.

Referring to the drawing in detail, the novel trap nest is indicated generally at 10, said nest including a support frame 12 and a nest enclosure 14 supported in the frame for vertical and rotational movement as will subsequently be described in detail.

The support frame may be constructed of suitably substantial material and may be rectangularly conformed as shown in the preferred embodiment, including rectangularly related vertical corner posts 16, 18, 20, and 22 which have extending between the upper ends thereof suitably secured top frame members 24, 26, 28 and 30. Extending between oppositely disposed intermediate portions of the legs or posts 16 through 22, in underlying parallel relationship to the top frame members 24 through 30, are suitably secured brace bars 32, 34, 36 and 38, respectively. The corner posts 16 and 22 define the entrance portion to the trap nest and have extending transversely between an intermediate portion thereof an elongated pivotal platform 40 hinged at opposite ends of the corner posts 16 and 22 by means of suitable hinge assemblies 42 (only one being shown), and hingedly secured by means of a suitable bracket element 44 on the under surface of the platform 40 is a brace rod 46, the lower end portion of which abutting the transverse brace 38 being received in a suitable upwardly opening aperture 48, see Figure 3. The corner posts 18 and 20 define the rear or exit portion of the trap nest and have extending transversely between oppositely disposed portions a platform member 50 hingedly supported at opposite ends by means of suitable hinge assemblies 52 (only one being shown), see Figure 2, and suitably secured on a pivot bracket 54 on the under surface of the platform member 50 is a support rod 56 the lower end portion of which being received in an upwardly opening aperture portion 58 in the transverse rod 34, see Figure 3.

The corner posts 16 and 18, and 20 and 22 have extending transversely therebetween suitably secured L-shaped oppositely disposed track elements 60, see Figure 4, for example, on which is disposed a removable egg collecting tray 62, rectangularly shaped and having disposed in one corner thereof a suitably secured panel 74 of a suitable shock absorbing material, such as canvas or the like for receiving thereon eggs laid by a hen in the enclosure 14 in a manner to subsequently be described in detail. The egg tray 62 being removable from the support frame beneath the platform 50 on the exit side of portion of the trap nest. A suitable transverse stop bar 76 may be secured between the corner posts 16 and 22 for engagement with a portion of the egg tray for permitting the same to be properly positioned on the support frame beneath the trap nest or enclosure portion for receiving eggs thereon.

Depending from intermediate portions of the top members 24 and 28 are pivot support brackets 78 and 80, respectively, which incorporate a transverse pivot pin element 82 therethrough, see Figures 1 and 2, which respectively support intermediately pivoted levers 84 and 86, opposite end portions of said levers having pivotally supported thereon by means of a suitable pivot pin 88 a suitable depending counter balance weight 90. The levers 84 and 86 incorporate a plurality of longitudinally spaced apertures 92 therethrough for the purpose of adjusting for varying weights in the chickens which with the trap nest is being used. Opposite end of the levers 84 and 86 have pivotally secured in a transverse aperture portion thereof depending force transmitting rods 94 and 96, respectively, which are disposed inwardly of the corner posts 18 and 22, respectively, extending through suitable guide sleeves 98 and 100, respectively, see Figure 3, secured in laterally extending relationship from an intermediate portion of the respective corner posts, said rods 94 and 96 being suitably secured at their lower ends to a lift bar 102 which extends diagonally between the corner posts 18 and 22. The lift bar 102 may comprise a rod portion 104, see Figure 5, being a continuation of the rods 94 and 96, and suitably disposed on the rod 104 is an inverted U-shaped channel element 106 which has suitably secured and extending vertically or normal from an intermediate upper surface portion thereof a stub shaft 108 upon which the enclosure 14 will be rotatably supported, see Figure 5, for example. The weight of the counter balance weights 90 will tend to raise the enclosure 14 vertically on the lift bar 102, and will be so graduated that when a chicken enters the enclosure 14 the weight of the chicken combined with that of the enclosure will be sufficient to overcome the counter balance weights 90 and the enclosure will accordingly move downwardly thus raising the weights 90 by vertically pivoting the levers 84 and 86 about the pivot elements 82.

Extending transversely between the upper members 26 and 30 is a suitably secured support bar 110 which is centrally apertured, and has overlying the upper surface portion thereof an inverted U-shaped yoke element 112, the central portion thereof having extending transversely therethrough a rectangular slot portion 114 which receives therein a helically twisted shaft 116 which extends integrally from a transverse bar 118 extending across the upper edge 120 of the enclosure 14. A transverse cotter pin 122 extends through the upper end of the helical screw 116 and is engageable with the upper surface of the yoke element 112 when the enclosure 14 is disposed at its lowermost position. Thus if the enclosure 14 moves downwardly due to the weight of a hen disposed therein, the enclosure will rotate by virtue of the engagement of the helical shaft 116 into the rectangular slot 114.

The enclosure 14 comprises a cylindrical shaped wire member 124 which is rotatable about a longitudinal axis of rotation defined by the helical screw 116 and a cap element 126, see Figure 5, which opens downwardly and is disposed on the stub shaft 108 previously described, said cap element 126 being suitably secured to a U-shaped support element 128, leg portions of which being suitably secured on opposite sides of an egg aperture 130 extending through a conical solid bottom portion 132 of the wire member 124. The upper surface portion 134 of the bottom 132 may have disposed thereon a suitable padding or nesting material to aid in protecting the eggs being laid thereon. Extending transversely through the side portion of the wire member 124 is an access aperture 136 which is normally disposed toward the entrance portion of the support frame as indicated in the upper portion of Figure 7. Extending from the edge of the aperture 130 in the bottom 132 of the wire member 124, see Figures 2, 3, 4 and 5, is an angularly directed suitably secured chute member 138 for directing eggs onto an egg-actuated latch means for a purpose to subsequently be described in detail. Extending transversely at the intersection of members 34 and 36 is a horizontal support plate 140, see Figure 3, which has suitably secured on the upper surface thereof an upwardly extending tubular sleeve 142 which has extending therethrough a support shaft 144 of an intermediately pivoted lever 146. The lever 146 has secured thereon a longitudinally adjustable balance weight 148 and includes an angular end portion 150, see Figures 3 and 4, extending in overlying relationship over the upper surface of the plate 140 and providing an abutment for the lever 146 which will be pivoted so the abutment 150 engages the upper surface of the plate 140. The other end of the lever 146 has suitably secured thereon a horizontally disposed elliptical shaped pocket element 152 which may be pivoted adjacent the flexible member 74 for disposing an egg thereon, said pocket element 152 being alignable with the chute portion 138 when the trap nest is rotated and disposed in the position indicated by 10' in the center portion of Figure 7, for example. In the position shown in the central portion of Figure 7, the hen is restrained from movement out of the enclosure 14 by means of a suitably secured vertically extending arcuate barrier 154 interposed between the entrance and exit portions of the support frame and suitably secured thereon, see Figure 1, said barrier 154 facing the access aperture 136 of the wire member 124 when the weight of a hen disposed on the bottom 132 of the nest is sufficient to cause downward movement of the enclosure 14 as previously described. The shaft 144 has extending from the end opposite the lever 146 an angular lever portion 155 which incoporates an elongated lost motion slot 156 in the end thereof receiving therethrough a pivot pin element 158 extending laterally from the lower end of a vertically displaceable stop pin or rod 160 reciprocably supported through a suitable support sleeve 162 integral on a vertical support member 164 carried in vertically extending relationship inwardly of the intersection of the frame members 34 and 36, see Figures 2 and 3. The stop pin or rod 160 will normally extend vertically at its upper end adjacent the outer periphery of the wire member 124, adjacent the lower edge portion thereof and will move downwardly as the pocket element 152 receives an egg thereon for subsequent deposit in the egg tray 62. The wire member 124, see Figure 6, has suitably secured in depending relationship on an outer peripheral edge thereof a plate member 166 from which a depending resilient finger 168 extends, said resilient finger 168 being engageable with the upper end of stop rod 160, and positioning the access aperture 136 at substantially right angles to the entrance and exit portions of the trap nest, disposing the hen H in the position shown in 10' of Figure 7. After a hen has laid an egg, the stop rod 160 moves downwardly permitting continued rotation of the enclosure 14 to the position shown at 10' in Figure 7, whereafter the access aperture 136 is disposed in alignment with the exit portion of the trap and the hen may pass out onto the horizontal platform 50. After the hen leaves the enclosure 14 the weight of the counter balance weights 90 will be sufficient to cause counter rotation of the enclosure 14 disposing the access aperture 136 in alignment with the entrance portion or horizontal platform 40 of the trap nest.

In order to locate the enclosure 14 in proper alignment with the entrance and exit portions of the support frame, stop elements 170 and 172, see Figure 1, are suitably secured on the upper frame members 30 and 26, respectively, for engagement with a laterally extending abutment element 174 which is secured on the transverse member 118 of the enclosure 14. The function of the stops is clearly shown in Figure 7.

In order to insure the disposition of eggs moving from the chute 138 toward the pocket element 152, a suitable baffle member 176 may be secured in vertically extending relationship from the horizontal support member 140 previously mentioned, see Figures 2 and 3.

Thus the novel trap nest may be disposed intermediate a pair of feed yards, and provide the only means wherein hens may move from one feed yard to the other. Thus the hens which are laying eggs will enter the trap nest, from one feed yard, lay an egg and be permitted to move to another feed yard and thus the laying hens will be separated from the "non-layers." Furthermore, as previously mentioned, the eggs will be immediately disposed in the tray beneath the enclosure preventing the hens from eating the eggs and for preventing the eggs from becoming dirty. Additionally, once the hen has entered the enclosure of the trap nest until she lays an egg she will not be permitted to move therefrom, and after becoming used to such trap nest will come to form the habit of laying an egg in order to move from one feed yard to the next.

The foregoing is considered as illustrative only of the principles of the invention. Further, since numerous modifications and changes will readily occur to those skilled in the art, it is not intended to limit the invention to the exact construction and operation shown and described, and accordingly all suitable modifications and equivalents may be resorted to, falling within the scope of the appended claims.

What is claimed as new is as follows:

1. A trap nest including a support frame including sides, entrance and exit portions on opposite sides of the frame, a vertical barrier intermediate the entrance and exit portions, a nest enclosure supported in said frame on a vertical axis of rotation, access aperture means extending through one side of the enclosure urged normally into alignment with the entrance portion for receiving a hen therethrough, means operatively connected to the enclosure responsive to the entrance of a hen into the enclosure for rotating the access aperture into alignment with the vertical barrier, and egg-actuated latch means on the frame operatively associated with the enclosure retaining the access aperture in alignment with the barrier and permitting the enclosure to rotate to align the access aperture with the exit portion when an egg has been deposited in the nest enclosure.

2. A trap nest including a support frame including sides, entrance and exit portions on opposite sides of said frame, a cylindrical nest enclosure supported in said frame for combined rotary and vertical movement, an arcuate barrier extending vertically between the entrance and exit portions adjacent the outer periphery of the nest enclosure, access aperture means extending through one side of the nest enclosure, counter balanced vertically displaceable pivot means on the frame rotatably supporting the weight of the enclosure for disposing the access aperture sequentially in alignment with the entrance portion, barrier and exit portion in response to entry of a chicken into the nest enclosure, and latch means operatively associated with the frame extendible into the path of rotation of the nest enclosure for restraining the access aperture in alignment with the barrier until an egg has been laid in the nest enclosure.

3. A trap nest including a support frame including sides, entrance and exit portions on opposite sides of said frame, a cylindrical nest enclosure supported in said frame for combined rotary and vertical movement, an arcuate barrier extending vertically between the entrance and exit portions adjacent the outer periphery of the nest enclosure, access aperture means extending through one side of the nest enclosure, counter balanced vertically displaceable pivot means on the frame rotatably supporting the weight of the enclosure for disposing the access aperture sequentially in alignment with the entrance portion, barrier and exit portion in response to entry of a chicken into the nest enclosure, and latch means operatively associated with said frame extendible into the path of rotation of the nest enclosure for restraining the access aperture in alignment with the barrier until an egg has been laid in the nest enclosure, said nest enclosure including a conical bottom portion converging in an aperture through which an egg will pass, the enclosure including a radial abutment on its lower edge engageable with the latch means, said latch means comprising a vertically displaceable stop element disposable in the path of rotation of the radial abutment, and a vertically pivotal counter balance lever assembly operatively associated with said frame including a portion engaged with the stop element for moving the same out of the path of rotation of the abutment, the lever assembly including a horizontally disposed egg catching pocket member for receiving an egg from the nest enclosure, the weight of the egg pivoting the lever assembly and permitting alignment of the access aperture with the exit portion of the support frame.

4. A trap nest including a support frame including sides, entrance and exit portions on opposite sides of said frame, a cylindrical nest enclosure supported in said frame for combined rotary and vertical movement, an arcuate barrier extending vertically between the entrance and exit portions adjacent the outer periphery of the nest enclosure, access aperture means extending through one side of the nest enclosure, counter balanced vertically displaceable pivot means on said frame rotatably supporting the weight of the enclosure for disposing the access aperture sequentially in alignment with the entrance portion, barrier and exit portion in response to entry of a chicken into the nest enclosure, and latch means operatively associated with said frame extendible into the path of rotation of the nest enclosure for restraining the access aperture in alignment with the barrier until an egg has been laid in the nest enclosure, the counter balanced vertically displaceable pivot means comprising a lift bar extending horizontally beneath the nest enclosure and including means upon which the enclosure is journaled at its lower end for rotation about its longitudinal axis, a helical shaft extending vertically from the top of the nest enclosure, a fixed nut element on the support frame rotatably receiving the helical shaft therein wherein vertical displacement of the nest enclosure results in rotary movement thereof, and a counter balance weight assembly on the frame including a vertically pivotal lever having a counter balance weight secured at one end, the other end of said lever being operatively connected to the lift bar for urging the nest enclosure upwardly with the access aperture thereof in alignment with the entrance portion of the support frame, the weight of a hen in the enclosure overcoming the counter balance weight and urging the enclosure to rotate for disposing the access aperture in alignment with the vertical barrier and vertically pivoting the pivot lever resulting in the counter balance weight being raised wherein egress of the hen from the nest enclosure after depositing an egg therein permitting the nest enclosure to counter rotate and align the access aperture thereof with the entrance portion of the support frame.

References Cited in the file of this patent

UNITED STATES PATENTS

| | | |
|---|---|---|
| 1,510,204 | Bazzill | Sept. 30, 1924 |
| 1,513,420 | Prescott | Oct. 28, 1924 |
| 1,616,661 | Keyse | Feb. 8, 1927 |